United States Patent [19]

Seng

[11] Patent Number: 4,853,024
[45] Date of Patent: Aug. 1, 1989

[54] SCRAP RECOVERY APPARATUS

[75] Inventor: Stephen Seng, Bladensburg, Ohio

[73] Assignee: Owens-Corning Fiberglas Corporation, Toledo, Ohio

[21] Appl. No.: 194,762

[22] Filed: May 17, 1988

[51] Int. Cl.⁴ ............................................. C03B 1/00
[52] U.S. Cl. ......................................... 65/335; 65/27; 65/134; 432/27; 432/197; 432/215
[58] Field of Search .......................... 65/27, 134, 335; 432/27, 197, 215

[56] References Cited

U.S. PATENT DOCUMENTS

| | | | |
|---|---|---|---|
| 2,310,603 | 2/1943 | Taylor | 259/3 |
| 2,571,342 | 10/1951 | Crowley, Jr. | 196/49 |
| 2,592,783 | 4/1952 | Aspegren | 257/55 |
| 2,872,386 | 3/1959 | Aspegren | 202/136 |
| 3,369,598 | 2/1968 | List | 165/90 |
| 3,728,094 | 4/1973 | Bowman | 65/335 X |
| 4,099,953 | 7/1978 | Rondeaux et al. | 65/335 |
| 4,119,395 | 10/1978 | Hatanaka et al. | 65/335 X |
| 4,135,904 | 1/1979 | Suzuki et al. | 65/335 X |
| 4,145,202 | 3/1979 | Grodin et al. | 65/2 |
| 4,188,228 | 2/1980 | Brzozowski | 106/50 |
| 4,207,943 | 6/1980 | Gardner et al. | 165/1 |
| 4,319,903 | 3/1982 | Hohman et al. | 65/27 |
| 4,338,113 | 7/1982 | Hohman | 65/27 |
| 4,353,725 | 10/1982 | Hohman et al. | 65/27 |
| 4,386,951 | 6/1983 | Hohman et al. | 65/27 |
| 4,401,453 | 8/1983 | Propster et al. | 65/27 |
| 4,409,011 | 10/1983 | Hohman et al. | 65/27 |
| 4,422,847 | 12/1983 | Propster et al. | 432/28 |
| 4,425,147 | 1/1984 | Hohman et al. | 65/27 |
| 4,436,588 | 3/1984 | Rammler et al. | 201/12 |
| 4,462,815 | 7/1984 | Propster et al. | 65/2 |
| 4,474,553 | 10/1984 | Takahashi | 432/27 |
| 4,588,429 | 5/1986 | Hohman et al. | 65/27 |
| 4,592,723 | 6/1986 | Seng | 432/13 |
| 4,696,691 | 9/1987 | Lawhon et al. | 65/27 |

FOREIGN PATENT DOCUMENTS 730732 11/1970 France .

OTHER PUBLICATIONS

"Heat Transfer by Contact Between Agitated Particles", Bozatli, et al.

Primary Examiner—Arthur Kellogg
Attorney, Agent, or Firm—Patrick P. Pacella; James F. Porcello

[57] ABSTRACT

The invention provides an improved apparatus for use in processing wet scrap textile glass fiber into a dry flowable powder. The apparatus includes a unique inlet and outlet structure to prevent clogging during operation. The apparatus also includes a unique discharge unit for ground dry glass fines composed of a pair of rod gratings place proximate the outlet of the apparatus.

9 Claims, 2 Drawing Sheets

SCRAP RECOVERY APPARATUS

BACKGROUND OF THE INVENTION

This invention relates to an improved apparatus for drying, oxidizing, and grinding scrap textile glass fibers and removing foreign material from the ground fibers to produce a recyclable dry, flowable powder. The present invention improves upon the process and apparatus of U.S. Pat. No. 4,353,725. The process and apparatus of the '725 patent recycles scrap glass by removing the binder, preheating and grinding the glass scrap. The '725 invention utilizes a rotary drum which receives heat transfer media and scrap glass at one end. As the drum rotates, the heat transfer media and scrap glass flow toward the outlet end. At the outlet end the preheated fines overflow from a discharge unit and are fed to a glass end process.

The '725 apparatus is acceptable for the recycling of dry, coarse, discontinuous glass fibers but encounters problems if used to process wet, fine, continuous glass fibers such as those used in textile reinforcement products. The process of recycling wet textile glass products creates a large amount of steam and water vapor, generated as the moisture evaporates from the scrap product. The steam and water vapor interfere with the ability of the firing tube of the '725 apparatus to properly and efficiently preheat the heat transfer media. Further, problems are encountered when attempting to process wet textile scrap with the '725 apparatus in that the scrap accumulates in the inlet of the rotary drum causing the inlet to plug and resulting in shut-down of the recycling system. Finally, another problem is encountered with the discharge unit of the rotary drum of the '725 invention. Because the discharge unit is incorporated in a side wall of the rotary drum, ground glass fines tend to accumulate at the discharge end of the rotary drum, preventing an even flow of fines through the discharge.

The improved apparatus of the present invention is intended to overcome the problems encountered by the '725 apparatus when used to process wet textile scrap glass. The present invention provides an apparatus for use in processing scrap textile glass fibers which drys, oxidizes, grinds, and screens the material into a dry, flowable powder. The present invention is comprised of a cylindrical drum rotatable about its axis. The drum includes an inlet frustum into which the wet textile scrap material and preheated media are placed for mixing within the drum. The frustum eliminates the clogging problems encountered with the '725 apparatus. The cylindrical drum also incorporates an unique separating system for removing glass particulate fines from the rotating drum and recycling the heat transfer media to the media hopper for reheating. A series of rod grates positioned proximate the outlet of the rotatable cylinder provides for a smooth flow of ground glass fines from the cylinder without creating the undersirable accumulation of fines at the discharge end of the rotating drum.

The present invention is intended to provide an apparatus which will dry, oxidize, and grind wet scrap textile glass fibers into a dry, flowable powder.

The apparatus of the present invention is intended to reduce clogging problems at the inlet of the rotatable drum.

The apparatus of the present invention is intended to facilitate the removal of dry particulate fines from the discharge end of the rotatable drum after processing.

DETAILED DESCRIPTION OF THE DRAWINGS

Figure 1:
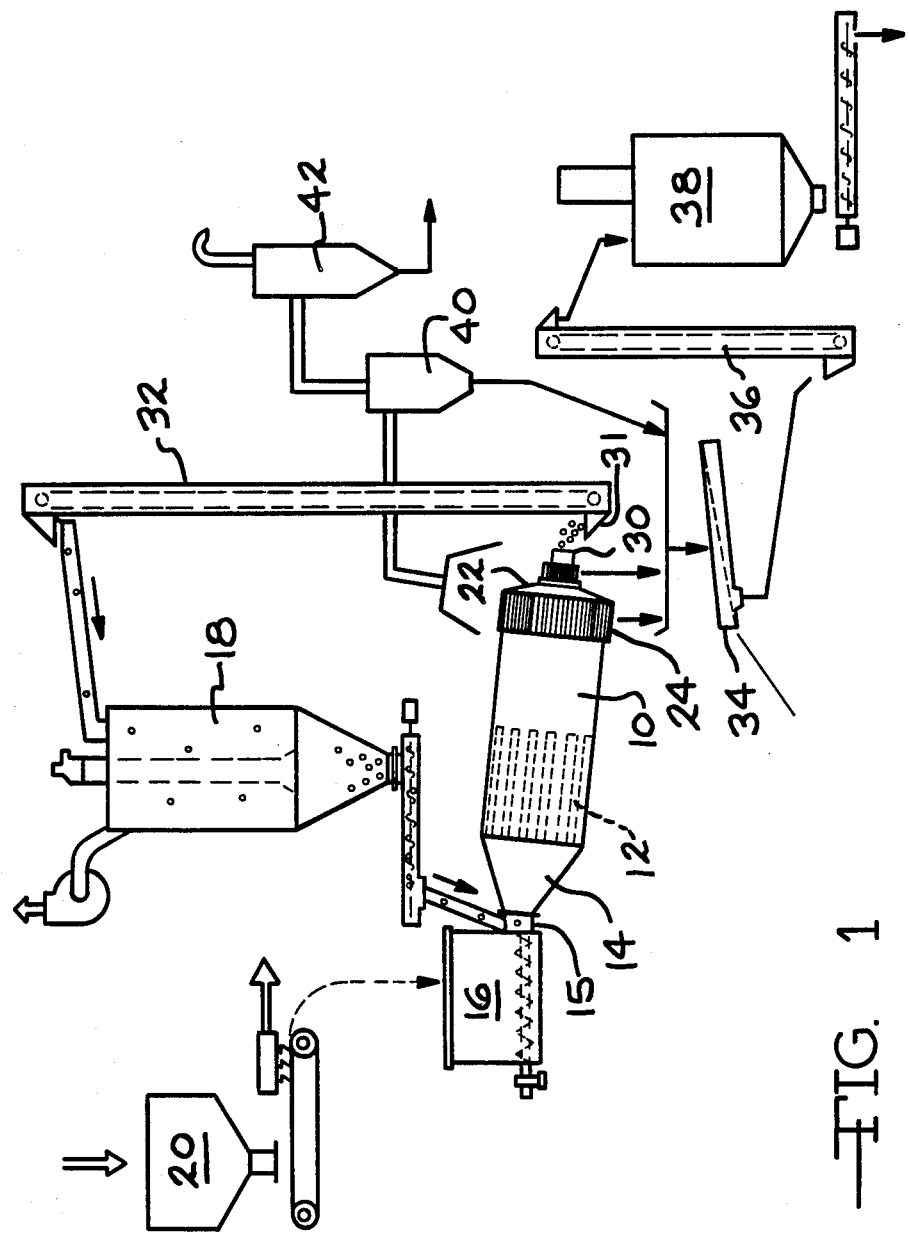
FIG. 1 is a schematic diagram of the scrap recovery system of the present invention.
Figure 2:
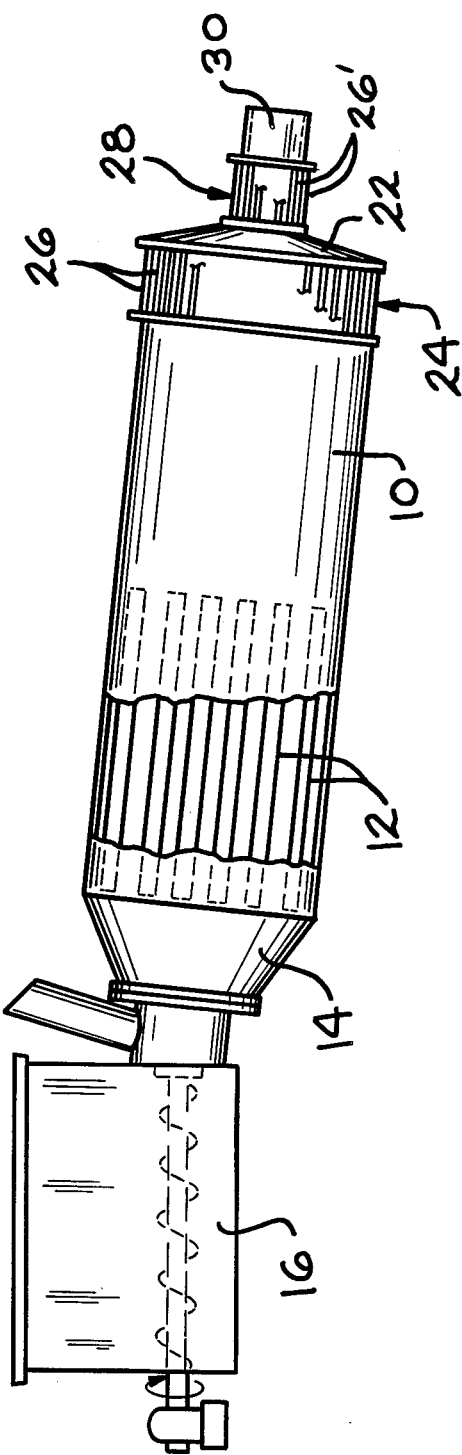
FIG. 2 is a side view of the cylindrical drum as used with the scrap recovery system of the present invention.

The scrap recovery system of the present invention relies upon a cylindrical drum 10 uniquely constructed to process wet textile glass scrap. The cylindrical drum 10 preferably is a hot ball mill with flights or lifts 12 axially aligned and spaced about the interior circumference of the first half of the mill 10. The mill 10 has an inlet frustum 14 for receiving wet textile glass scrap from a feeder mechanism 16 through an inlet pipe 15. The cone-shaped inlet frustum 14 enables the wet scrap to project into the drum 10 from the feeder mechanism 16, without allowing the scrap to buildup and clog the inlet pipe 15.

A heat transfer media hopper 18 is positioned proximate the inlet pipe 15 and supplies preheated transfer media to the wet scrap as the scrap is projected through the inlet pipe 15 by the feeder mechanism 16. The inlet frustum 14 enables the media balls to slide into the mill 10 rather than congesting the flow through the inlet pipe 15.

The outlet end of the mill 10 includes an outlet frustum 22 for facilitating removal of the heat transfer media from the mill 10. A first rod grating 24 is located about the circumference of the cylindrical mill 10 and fixed to the large diameter of the outlet frustum 22. The first rod grating 24 includes a plurality of axially extending and spaced rod members 26. Preferably the rod members 26 are one inch in diameter and have a ⅝ inch spacing. A second rod grating 28 is fixed between the small diameter of the frustum 22 and the outlet pipe 30. The second rod grating 28 is also composed of a plurality of axially extending rod members 26', preferably composed of ⅝ inch diameter rod members 26' on a ⅝ inch spacing. The first rod grating 24 allows for discharge of milled dry fines and the second rod grating 28 allows discharge of any remaining fines which tend to float on the surface of the heat transfer media.

The outlet frustum 22 is used as a ball ramp over-which the heat transfer media flow to the outlet pipe 30. The media flow from the outlet pipe 30 into a hopper 31 which has a plurality of rods (not shown) located on a ⅞ inch spacing any broken or worn media fall through the rods before the media is transferred to the return elevator 32. The media return elevator transfers the media to the media hopper for preheating and reuse.

The particulate fines which are collected from the first and second rod grates 24, 28 are placed in a separating screen apparatus 34 which screens oversize particulate and foreign matter from the fines and supplies the remaining fines to an elevator 36 for transfer to a fresh scrap hopper 38 for mixing with fresh glass batch. The oversize particles can be collected and returned to the feeder mechanism 16 for reprocessing.

The drying operation of the present invention produces large quantities of steam and water vapor with particulate fines entrained therein. The present invention includes a dust collection system which eliminates the steam and collects the dust. The steam and entrained dust are run through a cyclone 40 which eliminates large particles of scrap. The large particles of scrap are sent to the screen apparatus 34 for further processing. A venturi scrubber 42 or dilution duct and dust collector then strips any remaining particulate fines from the steam while outgassing the clean steam.

In the preferred embodiment, the wet textile scrap is preshredded in a shredding apparatus 20 prior to placement in the feeder mechanism 16. An alternative embodiment includes placement of the scrap in a washer (not shown) prior to the preshredding operation.

The apparatus of the present invention operates as follows. The wet textile scrap is washed and shredded in the shredding apparatus 20 to have a maximum four to six inch length. The wet textile scrap is generally fifteen to thirty percent moisture and has a density upon entering the feeder mechanism 16 of approximately ten pounds per cubic foot. The feeder mechanism 16 projects the shredded textile scrap into the inlet pipe 15 where it is mixed with heat transfer media, preferably one inch diameter alumina balls. The balls are preheated to an inlet temperature of 600° to 900° F., preferably 800° F. The balls and scrap glass mixture enters the ball mill 10 through the inlet frustum 14. As the ball mill 10 rotates, the lifts 12 act to mix the heat transfer media with the scrap glass, significantly heating the scrap and evaporating the water from the scrap. As the media and scrap move toward the discharge end of the ball mill 10, the media grinds the scrap into a powder having a density of seventy-five pounds per cubic foot. The outlet temperature for the scrap and media is approximately 400° F. and the scrap glass has zero moisture content. The media is recycled to the media hopper 18 for reheating and the scrap glass powder is removed via the rod grates 24, 28 to the screening member 34 of 20 mesh screen. The screening member 34 removes foreign material such as paper and other contamination as well as large particles of scrap. After the powder is screened, it is fed into the scrap hopper 38 for mixing with fresh batch ingredients.

The above description of the preferred embodiment is intended for illustrative purposes and is not intended to be limiting upon the scope and content of the following claims.

I claim:

1. An apparatus for processing wet textile scrap glass into glass batch material comprising, in combination: a cylindrical member of specified circumference having an inlet frustum and an opposed outlet frustum; means for supplying preheated transfer media to said inlet frustum; means for supplying scrap glass to said inlet frustum to mix with such heated transfer media in said inlet frustum; means for rotating said cylindrical member thereby causing such mixture of scrap glass and heated transfer media to move toward said outlet frustum as such scrap glass is ground and heated by such heated transfer media; a first rod grating for separating such heated and ground scrap glass from such transfer media, said fist rod grating including a plurality of rod members axially aligned and spaced about such circumference of said cylindrical member immediately proximate said outlet frustum, such spacing of said rod members forming openings which are less than the diameter of such transfer media and providing an opening in said cylinder from the interior to the exterior of said cylinder; a second rod grating also proximate said outlet frustum and extending axially from the minor circumference of said outlet frustum in a direction away from said cylindrical member, said second rod grating including a second set of rod members oriented axially and spaced to form openings smaller than the diameter of such transfer media; and means for transporting such transfer media from said outlet frustum to said supply means for reheating.

2. The processing apparatus of claim 1, wherein said cylindrical member further includes a plurality of spaced lifts extending axially about the interior circumference of said cylindrical member.

3. The processing apparatus of claim 1, wherein said supply means includes a means for reducing the length of such textile fibers prior to delivery to said inlet frustum.

4. The processing apparatus of claim 1, further including a cleaning means for drawing steam and entrained particulate fines from said cylindrical member and for separating such particulate fines from such steam.

5. The processing apparatus of claim 4, wherein said cleaning means includes a cyclone member for removing large particulate fines and a scrubber member for separating any remaining fines and discharging water.

6. The processing apparatus of claim 1, further including a collection means for receiving ground glass particulate from said first and second rod grating, said collection means operating to separate fine ground glass particulate from coarse particulate and foreign matter.

7. The processing apparatus of claim 6, further including a transfer means positioned between said collection means and said supply means for recycling such coarse particulate into such scrap glass for reprocessing.

8. The processing apparatus of claim 1, wherein such wet textile scrap is between 15% and 30% moisture by volume upon entering said scrap glass supply means and approximately 0% moisture upon passage through said first and second rod gratings.

9. The processing apparatus of claim 1, wherein such transfer media are preheated to an inlet temperature in the range of 600° to 900° F. and have an temperature upon reaching said transporting means of approximately 400° F.

* * * * *